US006975474B2

United States Patent
Naka (10) Patent No.: US 6,975,474 B2
(45) Date of Patent: Dec. 13, 2005

(54) METHOD AND APPARATUS FOR READ ERROR RECOVERY IN A DISK DRIVE WITH A GMR READ HEAD

(75) Inventor: Hiroyuki Naka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 10/800,972

(22) Filed: Mar. 16, 2004

(65) Prior Publication Data

US 2004/0212909 A1 Oct. 28, 2004

(30) Foreign Application Priority Data

Apr. 25, 2003 (JP) .............................. 2003-122520

(51) Int. Cl.[7] ................................................ G11B 5/03
(52) U.S. Cl. .......................... 360/66; 360/51; 360/46; 360/55; 360/75
(58) Field of Search .................... 360/53, 75, 324, 360/323, 25, 66–68

(56) References Cited

U.S. PATENT DOCUMENTS

| | | | | |
|---|---|---|---|---|
| 5,650,887 A | * | 7/1997 | Dovek et al. .................. | 360/75 |
| 5,831,782 A | * | 11/1998 | Kohno et al. .................. | 360/66 |
| 5,969,896 A | * | 10/1999 | Nakamoto et al. ............. | 360/66 |
| 6,067,200 A | * | 5/2000 | Ohba et al. .................... | 360/66 |
| 6,128,160 A | | 10/2000 | Yamamoto | |
| 6,324,029 B1 | * | 11/2001 | Matsubara et al. ............ | 360/75 |
| 6,490,115 B1 | * | 12/2002 | Suzuki et al. ................. | 360/75 |
| 6,522,134 B1 | * | 2/2003 | Gill ............................ | 324/210 |
| 2002/0118475 A1 | * | 8/2002 | Ng et al. ...................... | 360/46 |
| 2003/0117737 A1 | * | 6/2003 | Jang et al. ..................... | 360/66 |
| 2004/0047063 A1 | * | 3/2004 | Lum et al. .................... | 360/53 |

FOREIGN PATENT DOCUMENTS

| | | |
|---|---|---|
| JP | 10-49837 | 2/1998 |
| JP | 11-191201 | 7/1999 |
| JP | 2001-93104 | 4/2001 |

* cited by examiner

Primary Examiner—David Hudspeth
Assistant Examiner—Dismery Mercedes
(74) Attorney, Agent, or Firm—Pillsbury Winthrop Shaw Pittman, LLP (57) ABSTRACT

A disk drive is disclosed which has a facility to perform a pinning reset operation on a GMR read element included in a head if a read retry operation fails to achieve recovery from a read error. When a bias and write currents are supplied to the head, a CPU of the disk drive determines an optimum bias and write currents on the basis of a temperature measured value of the GMR read element.

3 Claims, 6 Drawing Sheets

METHOD AND APPARATUS FOR READ ERROR RECOVERY IN A DISK DRIVE WITH A GMR READ HEAD

CROSS-REFERENCE TO RELATED APPLICATIONS

This application is based upon and claims the benefit of priority from prior Japanese Patent Application No. 2003-122520, filed Apr. 25, 2003, the entire contents of which are incorporated herein by reference.

BACKGROUND OF THE INVENTION

1. Field of the Invention

The present invention generally relates to disk drives, and in particular, to read error recovery in a read operation using a GMR read head.

2. Description of the Related Art

In recent years, disk drives, typified by hard disk drives, have employed a magnetic head having a giant magnetoresistive (GMR) read element (also referred to as a GMR sensor) and a write element separately provided in the same slider in order to promote high-density recording.

The GMR read element operates as a read head to read data recorded on the disk medium. The write element operates as a write head to generate a recording magnetic field in accordance with a write current to magnetically record data on the disk medium.

The GMR read element is generally designed so that two ferromagnetic layers are arranged across a non-magnetic layer. One of the ferromagnetic layers is called a free layer and is magnetized in a fixed direction when no external magnetic fields are present.

The other ferromagnetic layer is called a pinning layer and is magnetized in a fixed direction perpendicular to the magnetizing direction of the free layer when no external magnetic fields are present. In general, the application of external magnetic fields does not vary the magnetizing direction of the pinning layer. To fix the magnetizing direction, an antiferromagnetic layer called a fixed layer is stacked on the pinning layer in direct contact with it. The fixed layer provides a fixing magnetic field to fix the magnetizing direction of the pinning layer on the basis of exchange coupling.

In the GNR read element, the magnetizing direction of the free layer varies depending on the magnetic flux direction of magnetic recording with respect to the surface of the disk medium. Furthermore, resistivity varies depending on the magnetizing angle between the free layer and the pinning layer. In this case, the GMR read element is pre-supplied with a bias current (sense current) and can thus read data magnetically recorded on the disk medium as a variation in magnetizing direction.

When for example, ESD (electrostatic discharge) or disturbance noise (crosstalk or the like) causes temperature of the GMR read element to increase above the blocking temperature of the antiferromagnetic layer, the magnetizing direction of the antiferromagnetic layer is reversed. Thus, the magnetizing direction of the pinning layer, exchange-coupled to the antiferromagnetic layer, is also reversed. Here, the blocking temperature means the temperature at which the exchange anisotropy of the antiferromagnetic layer disappears.

Furthermore, if the disk drive undergoes temperature stress for a long time owing to the physical contact between the GMR read element and the disk medium, heating resulting from a bias current, or the like, then the initial direction of the pinning layer cannot be fixed because of surrounding magnetic fields. Thus, for the GMR read element, a read signal output may be degraded or the waveform of an output signal may vary. Consequently, the GMR read element cannot provide its predetermined performance.

When the performance of the GMR read element is thus degraded by the reversal of the pinning layer, a read error may occur during a read operation of reading user or servo data from the disk medium.

To solve such a problem, a method has been proposed which senses that the magnetizing direction of the pinning layer in the GMR read element has been reversed and which then applies a predetermined current pulse to recover the original magnetizing direction (refer to, for example, Jpn. Pat. Appln. KOKAI Publication No. 11-191201 or U.S. Pat. No. 5,650,887).

Another method has been proposed which simultaneously provides a bias current and a write current to recover the magnetizing direction of the pinning layer (refer to, for example, Jpn. Pat. Appln. KOKAI Publication No. 10-49837 or U.S. Pat. No. 5,969,896).

However, with the above prior art methods, when pinning reset is executed to recover the magnetizing direction of the pinning layer, if a current pulse is applied as a reset pulse, then the GMR read element may be physically broken down. Furthermore, the method of simultaneously applying a bias current and a write current may create similar problems even if a bias current is supplied which has a current value excessively larger than a normal one.

BRIEF SUMMARY OF THE INVENTION

In accordance with one embodiment of the present invention, there is provided a disk drive including facilities to avoid problems such as the physical breakdown of a GMR read element when a pin resetting operation is performed on the GMR read element.

The disk drive comprises a head having a giant magnetoresistive (GMR) read element which reads data from a disk medium and a write element which writes data to the disk medium; an actuator mechanism on which the head is mounted and which moves to a specified position on the disk medium; current supply units which supply a bias current and a write current to the GMR read element and the write element, respectively; and a control unit which determines, on the basis of a resistance value of the GMR read element, an optimum bias and write currents required to successfully execute pinning reset on the GMR read element and which allows the optimum bias and write currents to be supplied to the head.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
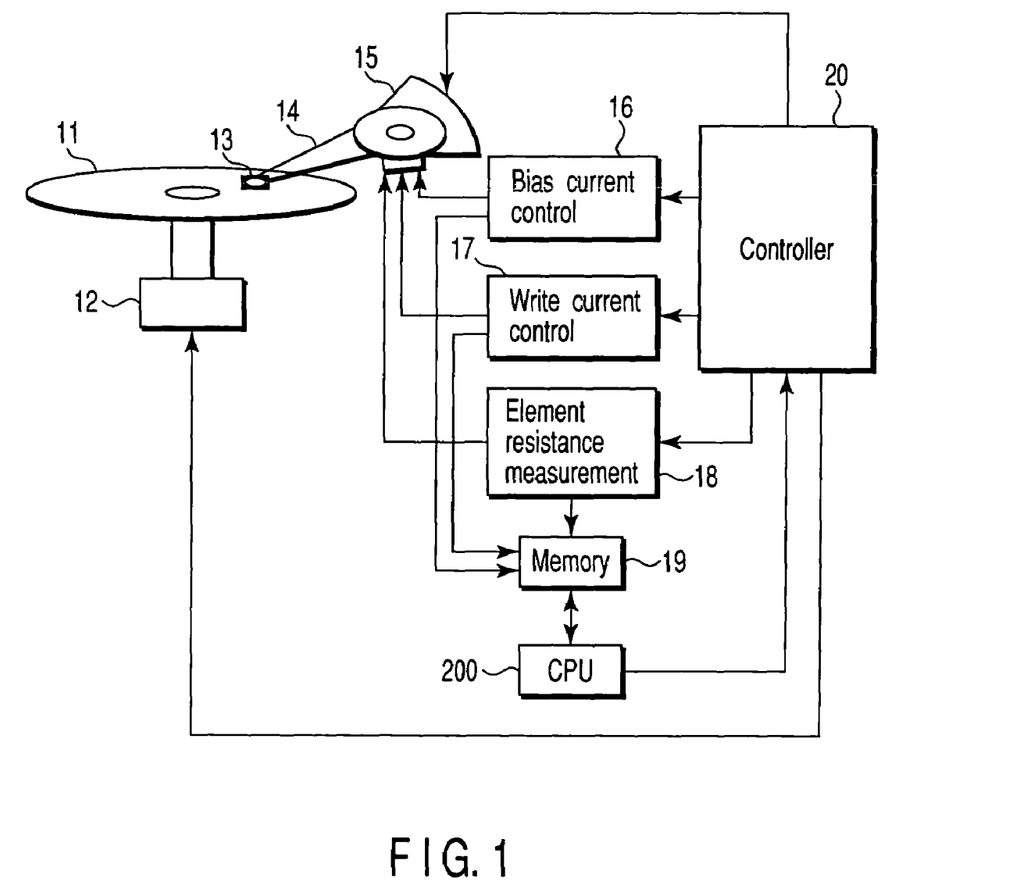
FIG. 1 is a block diagram showing essential parts of a disk drive according to an embodiment of the present invention.
Figure 2:
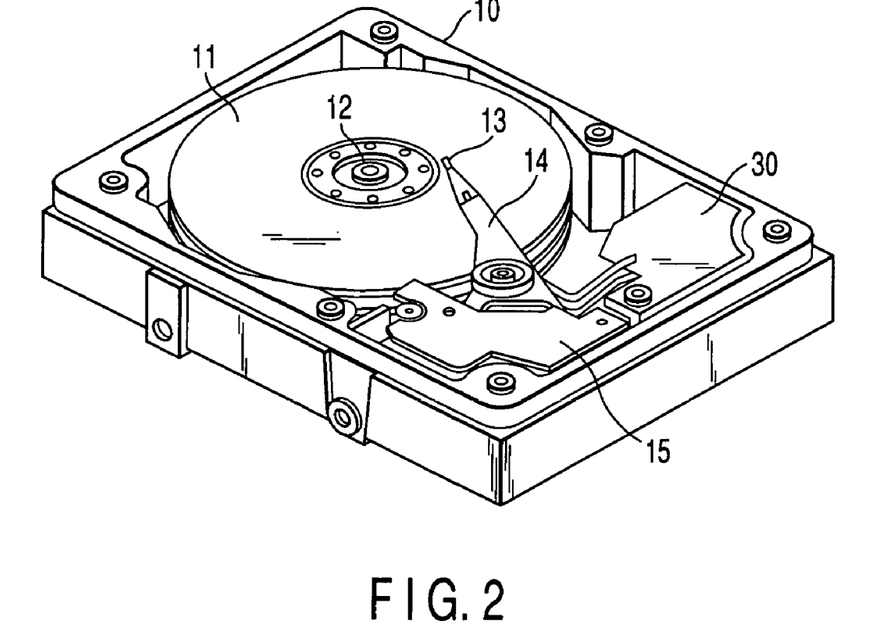
FIG. 2 is a view showing the appearance of the disk drive according to the present embodiment.

FIG. 1 is a view showing essential parts of a disk drive according to the present embodiment. FIG. 2 is a view showing the appearance of the disk drive.

(Configuration of Disk Drive)

A disk drive comprises a housing 10 incorporating a disk medium 11, a spindle motor (SPM) 12, a magnetic head 13, an actuator 14, and a circuit board 30 on which various circuits are mounted, as shown in FIG. 2.

As shown in FIG. 1, the disk medium 11 is rotated by the SPM 12. The head 13 is mounted on the actuator 14 so that the driving force of a voice coil motor moves the head 13 on the disk medium 11 in its radial direction. The head 13 is a magnetic head in which a GMR read element (GMR sensor) and a write element are separately mounted on the same slider.

The disk drive further has, for example, a bias current control circuit 16, a write current control circuit 17, an element resistance measurement circuit 18, and a controller 20 mounted on the circuit board 30. The disk drive also has a microprocessor (CPU) 200 and a memory 19 mounted on a circuit board different from the circuit board 30.

The CPU 200 is a main control device for the disk drive to perform a pinning reset operation on the GMR read element according to the present embodiment, as well as a read error recovery process and movement control for the head 13.

The controller 20 controls, via the bias current control circuit 16, the supply of a bias current to the GMR read element, included in the head 13, in accordance with the control provided by the CPU 200. The controller 20 also controls, via the write current control circuit 17, the supply of a write current to the write element, included in the head 13. The controller 20 further controls the element resistance measurement circuit 18 to measure the resistance value of the GMR read element and store the result of the measurement in a memory 19 when a bias current and a write current are supplied.

The memory 19 is accessed by the CPU 200 and stores not only the resistance value of the GMR read element but also a bias current value, a write current value, and relationship information indicative of the relationship between the write current value and the current values and a temperature coefficient.

(Structure of GMR Read Element)

Figure 3:
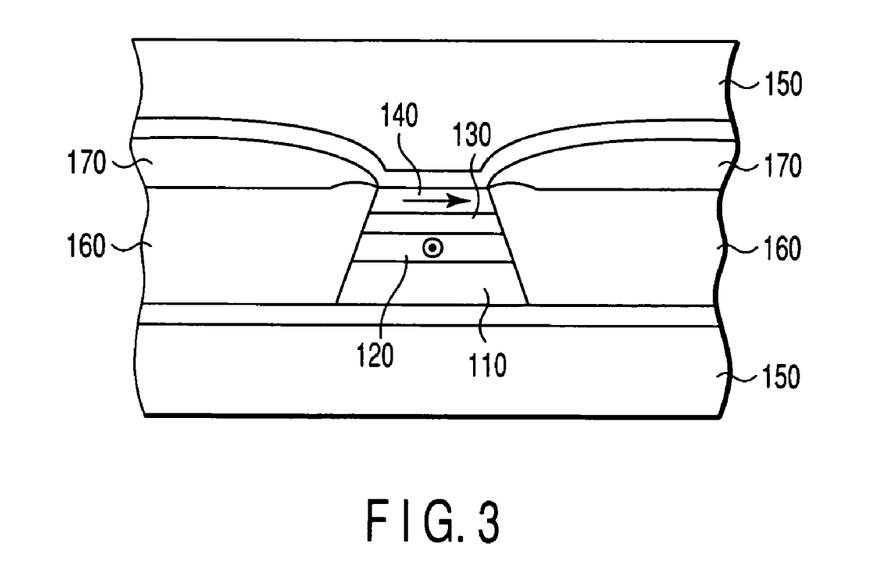
FIG. 3 is a view illustrating the structure of a GMR read element according to the present embodiment.

The GMR read element has an antiferromagnetic layer 110, a pinning layer 120, a non-magnetic intermediate layer 130, and a free layer 140 as shown in FIG. 3 (a view showing a surface of the GMR read element which is opposite the surface of the disk medium). Shields 150 are arranged so as to sandwich these layers between them. The GMR read element has a hard magnetic layer 160 that applies a bias magnetic field to the free layer 140 to suppress a Barkhausen noise and the like. The GMR read element also has an electrode layer through which a bias current is conducted.

Here, the magnetizing direction (arrow) of the pinning layer 120 is fixed (pinned) in a direction orthogonal to the free layer 140 in a film surface owing to exchange coupling to the antiferromagnetic layer 110.

When the GMR read element nears the surface of the disk medium, the magnetizing direction of the free layer 140 varies depending on the magnetic flux direction of magnetic recording on the surface. This in turn varies the electric resistance of the GMR element. In this case, an already supplied bias current enables data magnetically recorded on the disk medium to be read on the basis of the variation in magnetizing direction (a variation in output current waveform).

FIGS. 4A to 4D are views illustrating pinning reset of the GMR read element according to the present embodiment.

Figure 4A:
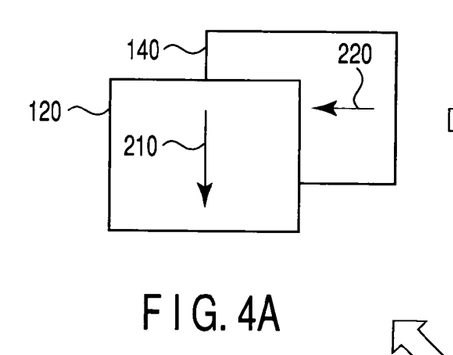
FIGS. 4A to 4D are views illustrating operations of the GMR read element according to the present embodiment.
Figure 4B:
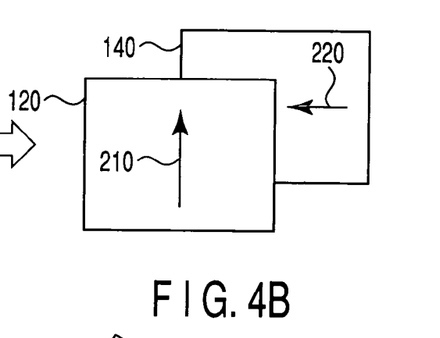
Figure 4C:
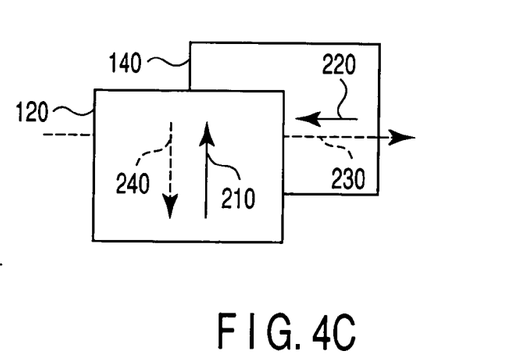
Figure 4D:
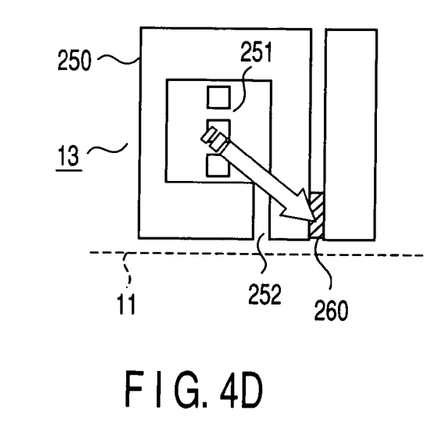

FIG. 4D is a side view showing the structure of the head 13 and the positional relationship between the head 13 and the disk medium 11. As shown in FIG. 4D, the head 13 includes a write element 250 separated from a GMR read element 260. In the write element 250, when a write current is supplied to a coil 251, a recording magnetic field is generated in a gap 252. At this time, the GMR read element 260 has its temperature increased by heat (arrow) generated in accordance with the write current.

FIGS. 4A to 4C are conceptual drawings of the pinning layer 120 and the free layer 140, in which the GMR read element 260 in FIG. 4D is viewed from the right.

As shown in FIG. 4A, initially, a magnetizing direction 210 of the pinning layer 120 is fixed in a direction orthogonal to a magnetizing direction 220 of the free layer 140. Then, as shown in FIG. 4B, the magnetization 210 of the pinning layer 120 is reversed by ESD, disturbance noise, or the like.

With the magnetizing direction 210 of the pinning layer 120 reversed, when a bias current 230 is conducted through the free layer 140 as shown in FIG. 4C, a current field 240 is applied to the pinning layer 120. The pinning layer 120 is also heated by the bias current 230. At this time, when a write current is supplied to the write element 250 as shown in FIG. 4D, the coil 251 of the write element 250 functions as a heater. The GMR element 260 is thus heated (arrow).

This process returns the reversed magnetizing direction 210 of the pinning layer 120 to its original position as shown in FIG. 4A. This is called pinning reset (or a pinning reset effect).

In the present embodiment, the controller 20 of the disk drive determines optimum values for a bias current and a write current such as those described above, in accordance with the control provided by the CPU 200. The controller 20 thus supplies the bias and write currents to achieve the pinning reset. On this occasion, to avoid a voltage induced by the write current and applied to the GMR read element, that is, crosstalk, it is preferable that the write current be direct (DC). Furthermore, to avoid breakdown, it is preferable that a voltage value for the bias current be set so as not to exceed 400 V. Moreover, it is preferable that the bias and write currents be continuously and relatively conducted for a long time.

Figure 7:
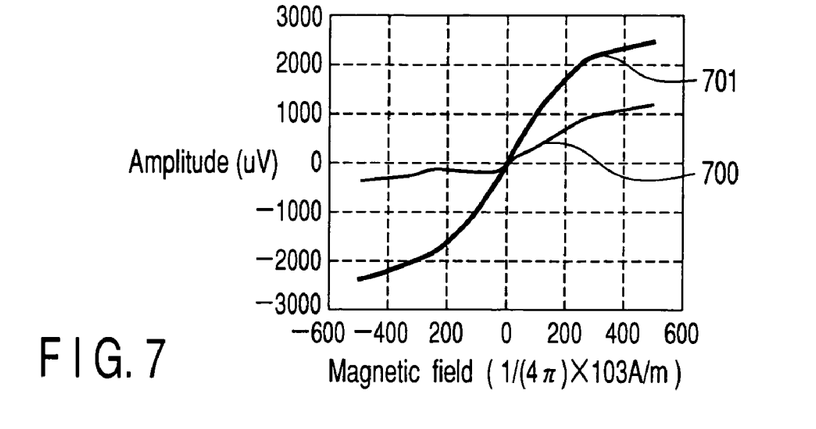
FIGS. 7, 8, and 9 are views illustrating characteristics of a GMR read element according to the embodiment shown in FIG. 6.

FIG. 7 shows the results of experiments in which a pinning reset operation was actually performed. This figure shows ρ-H curves obtained by using a QST (Quasi Static Tester) to measure amplitude before and after supplying a bias current of 7.5 mA to the GMR element the output of which has been reduced by pinning reversal, while simultaneously conducting a write current of 60 mA for 2 minutes. QST measurement conditions are 500 Oe and 4.5 mA.

In FIG. 7, as is apparent from a measurement result 701 obtained after the bias and write currents have been conducted compared to a measurement result 702 before the conduction, an output (amplitude) of the GMR read element has increased from 1,500 uV to 5,000 uV.

(Read Error Recovery Method)

With reference to the flow chart in FIG. 5, description will be given below of a method of recovering from a read error by executing pinning reset on the GMR read element in the disk drive according to the present embodiment, the GMR read element having undergone pinning reversal owing to ESD, disturbance noise, or the like.

First, when a normal read operation is performed and if a read error occurs, then the CPU 200 causes a read retry operation to be performed (step S1). Normally, the retry operation is repeated a predetermined number of times.

If the retry operation fails to achieve recovery from the read error, then in the present embodiment, the CPU 200 determines that ESD, disturbance noise, or the like has reversed the magnetizing direction of the pinning layer of the GMR read element, included in the head 13, to reduce the output of a read signal, resulting in the read error (NO in step S2). Naturally enough, if the retry operation makes the recovery from the read error succeed, the CPU 200 shifts to a normal operation (for example, the next read or write operation) (YES in step S2).

The CPU 200 instructs the controller 20 to change the bias current value of the GMR read element (step S3). The CPU 200 then causes a read operation (which is different from the normal retry operation) to be performed again using the GMR read element for which the bias current has been changed (step S4). If this read operation makes the recovery from the read error succeed, the CPU 200 shifts to a normal operation (YES in step S5).

On the other hand, if the recovery from the read error fails, the CPU 200 shifts to the pinning reset operation according to the present embodiment (NO in step S5). First, the CPU 200 drivingly controls the actuator 14 (actually the VCM 15) to move the head 13 to an area on the disk medium in which no user data is recorded, or to an unload position (step S6).

Here, the area in which no user data is recorded is, for example, the outermost or innermost peripheral area on the disk medium 11 and is of course different from a system area. The unload position is a position provided outside the disk medium 11 at which the head 13 is parked. A member holding the head and called a ramp member or a parking member is arranged in the unload position.

The CPU 200 supplies a bias current and write current to the head 13 via the controller 20 to heat the GMR read element. On this occasion, the controller 20 stores the values of currents supplied by the bias current control circuit 16 and write current control circuit 17, in the memory 19. The controller 20 also controls the element resistance measurement circuit 18 to measure the resistance value of the element resistance measurement circuit 18 in association with the bias and write current values and store the result of the measurement in the memory 19.

With reference to the relationship information already stored in the memory 19 and indicating the relationship between the resistance value and bias current and write current and temperature coefficient of the GMR read element, the CPU 200 calculates the relationship between the resistance value and bias current and write current and temperature coefficient (step S7).

Moreover, with reference to the relationship information stored in the memory 19, the CPU 200 measures (calculates) an actual temperature (a rise in element temperature) occurring in the GMR read element on the basis of the relationship between the resistance value and bias current and write current and temperature coefficient (step S8).

The CPU 200 determines the optimum bias and write current values required for effective pinning reset on the basis of the relationship between the temperature state of the GMR read element and the pinning reset effect (step S9).

On the basis of the optimum bias and write current values determined by the CPU 200, the controller 20 causes the bias current control circuit 16 and the write current control circuit 17 to supply a bias current and a write current to perform a pinning reset operation (step S10). The CPU 200 drivingly controls the actuator 14 to move the head 13 to the original read position on the disk medium 11 (step S12). Then, the CPU 200 causes a read operation to be performed again (step S12).

If this read operation makes it possible to recover from the read error, the CPU 200 shifts to the normal operation (YES in step S13). On the other hand, if the recovery from the read error fails, the CPU 200 determines that it is impossible to recover from the read error and that this is what is called a hard error (NO in step S13).

In short, as described above, with the read error recovery method according to the present embodiment, if the normal read retry operation fails to achieve recovery from a read error, a pinning rest operation is performed on the GMR read element to recover from the read error. In this case, to produce the pinning reset effect, the optimum bias and write current values are determined to perform a pinning reset operation.

Specifically, before a pinning reset operation is performed, the optimum bias and write current values are determined on the basis of the temperature state (resistance value) of the GMR read element. Consequently, pinning reset can be effectively accomplished. Furthermore, the optimum bias and write current values can be set so as to avoid the physical breakdown of the GMR read element.

The optimum bias and write currents are simultaneously supplied to the head 13. To avoid a voltage induced by the write current and applied to the GMR read element, that is, crosstalk, it is preferable that the write current be direct (DC). Furthermore, to avoid breakdown, it is preferable that a voltage value for the bias current be set so as not to exceed 400 V. Moreover, it is preferable that the bias and write currents be continuously and relatively conducted for a long time.

Figure 8:
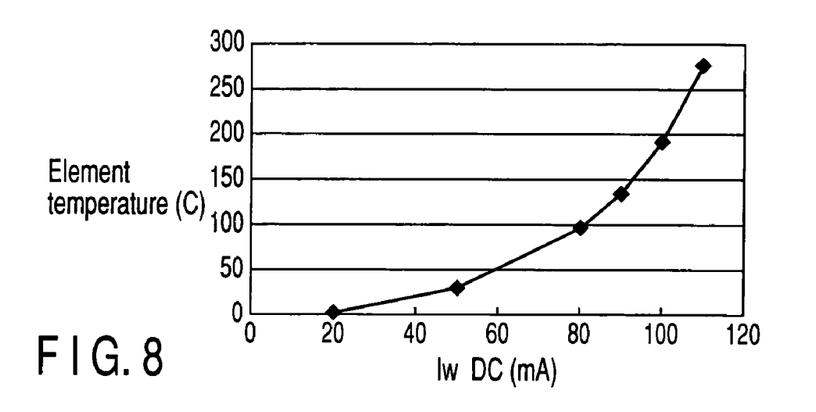
Figure 9:
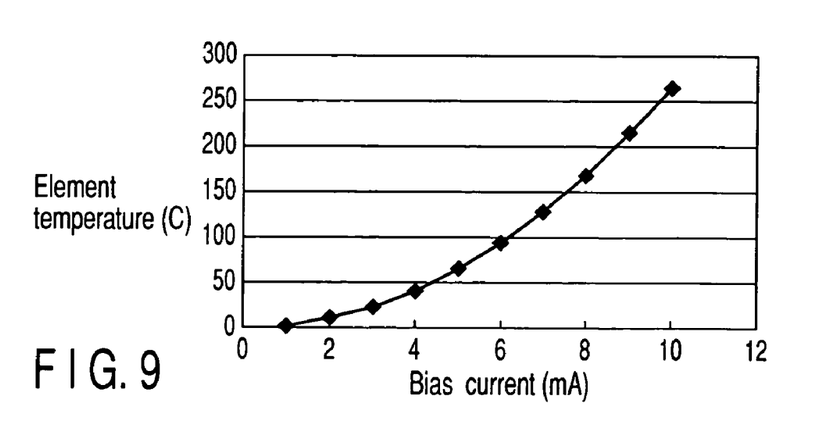

FIGS. 8 and 9 show examples of results of calculations of the temperature of the GMR read element (a rise in element temperature) resulting from the write and bias currents, respectively, during pinning reset according to the present embodiment.

(Another Embodiment)

Figure 6:
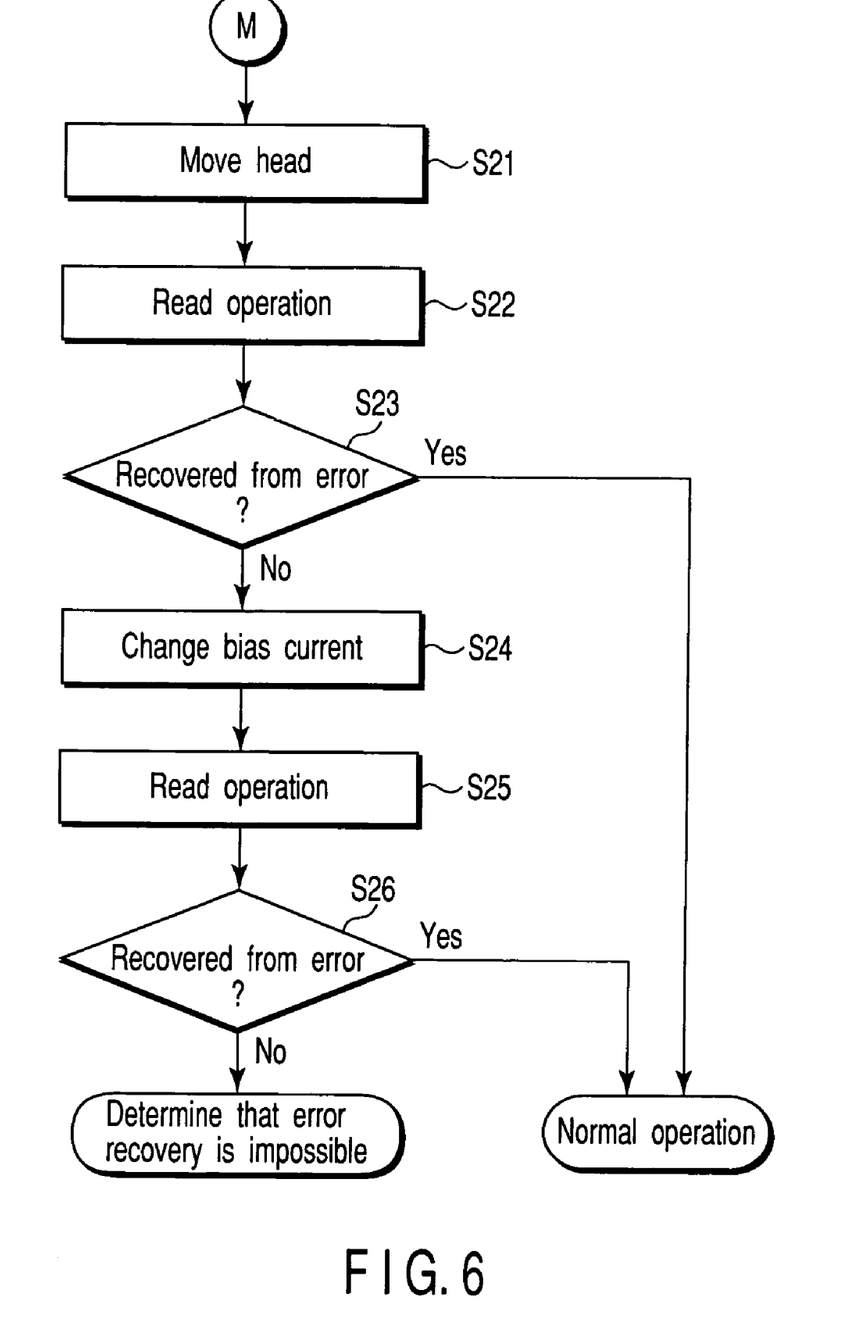
FIG. 6 is a flow chart according to another embodiment.

FIG. 6 is a flow chart for another embodiment.

Figure 5:
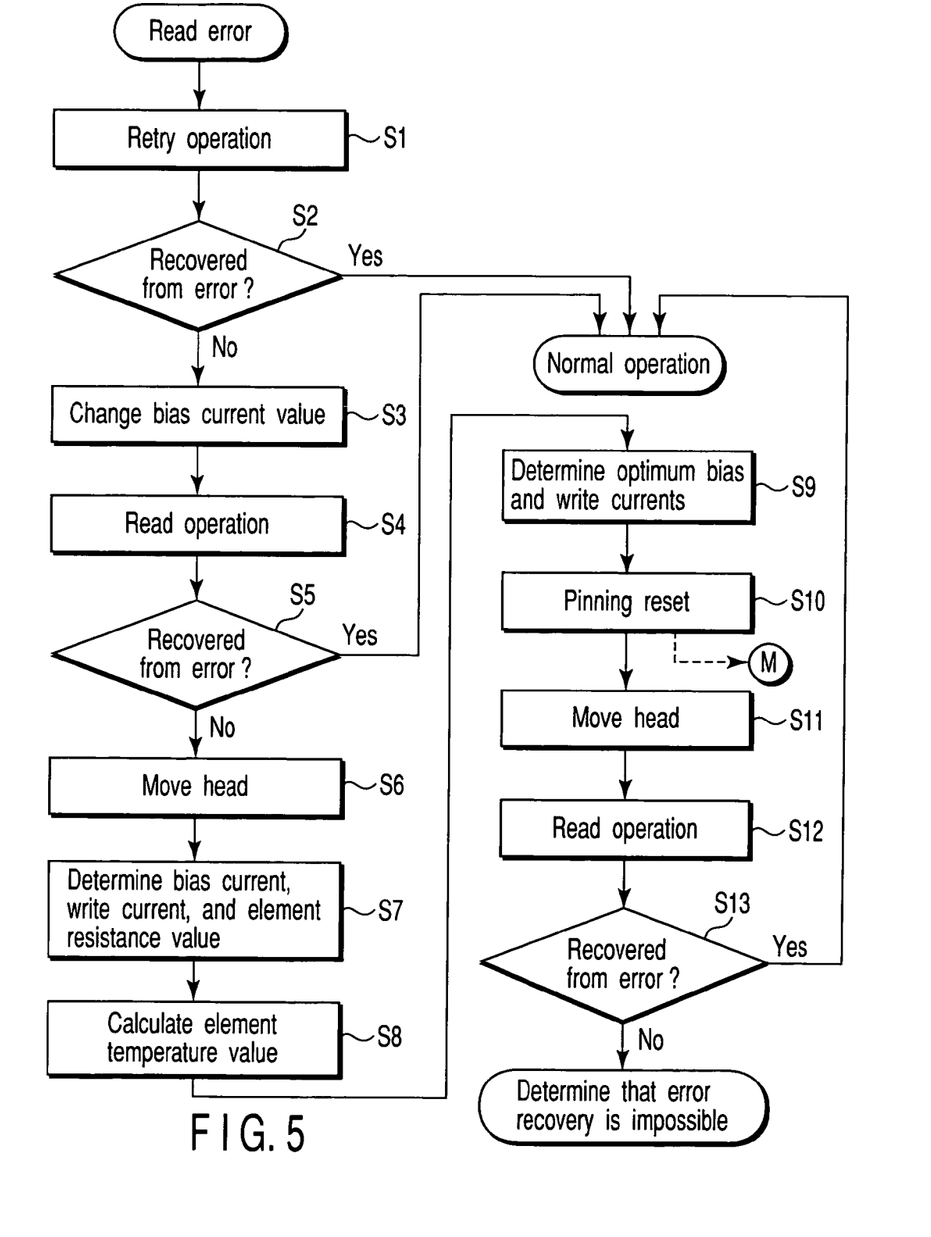
FIG. 5 is a flow chart illustrating a read error recovery method according to the present embodiment.

The present embodiment provides a method including, after the step of performing the pinning rest operation shown at step S10 in FIG. 5, an additional step of changing the bias current again if recovery from the read error fails.

Specifically, as shown in FIG. 6, the CPU 200, after the pinning reset operation, drivingly controls the actuator 14 to move the head 13 to the original read position on the disk medium 11 (step S21). Then, the CPU 200 causes a read operation to be performed again (step S22). If this read operation makes the recovery from the read error succeed, the CPU 200 shifts to the normal operation (YES in step S23).

If the recovery from the read error fails, the CPU 200 causes the operating bias currents through the GMR read elements to be changed (step S24). After the pinning reset, the sensitivity of the GMR read elements may change from its original state. Accordingly, the operating bias current value is changed to recover the original sensitivity of the GMR read element.

Then, if reperforming a read operation has made the recovery from the read error succeed, the CPU 200 shifts to the normal operation (YES in steps S25 and S26). If the recovery from the read error still fails, the CPU 200 determines that this is a hard error (NO in step S26).

As described above, the possibility of recovering from a read error is increased by executing pinning reset on the GMR read element undergoing pinning reversal owing to ESD, disturbance noise, or the like. Therefore, the present invention is effective on recovery from a read error caused by the reversal of the magnetization in the pinning layer of the GMR read element.

In other words, the optimum pinning reset operation can be performed which successfully executes pinning reset on the GMR read element succeed and which can avoid problems such as the physical breakdown of the element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a head having a giant magnetoresistive (GMR) read element which reads data from a disk medium and a write element which writes data to the disk medium;
   an actuator mechanism on which the head is mounted and which moves to a specified position on the disk medium;
   current supply units which supply a bias current and a write current to the GMR read element and the write element, respectively; and
   a control unit which determines, on the basis of a resistance value of the GMR read element, an optimum bias and write currents required to successfully execute pinning reset on the GMR read element and which allows the optimum bias and write currents to be supplied to the head,
   wherein, when a read error occurs during a read operation of reading data from the disk medium, the control unit causes the actuator mechanism to move the head to a specified position on the disk medium or outside the range of the disk medium and then causes the current supply units to supply the optimum bias and write currents to the head, and
   wherein, if recovery from the read error fails, the control unit changes the bias current value to re-perform the read operation.

2. A disk drive comprising:
   a head having a giant magnetoresistive (GMR) read element which reads data from a disk medium and a write element which writes data to the disk medium;
   an actuator mechanism on which the head is mounted and which moves to a specified position on the disk medium;
   current supply units which supply a bias current and a write current to the GMR read element and the write element, respectively; and
   a control unit which determines, on the basis of a resistance value of the GMR read element, an optimum bias and write currents required to successfully execute pinning reset on the GMR read element and which allows the optimum bias and write currents to be supplied to the head,
   wherein, when a read error occurs during a read operation of reading data from the disk medium, if recovery from the read error fails even though a read retry operation is performed, the control unit causes the actuator mechanism to move the head to a specified position on the disk medium or outside the range of the disk medium and then causes the current supply units to supply the optimum bias and write currents to the head, and
   wherein, if recovery from the read error fails, changes the bias current value to re-perform a read operation.

3. A method of read error recovery in a disk drive including a disk medium and a head which has a GMR read element and a write element, the method comprising:
   using the GMR read element to perform a read operation of reading data from the disk medium and then determining whether or not a read error has occurred;
   moving the head to a specified position on the disk medium or outside the range of the disk medium, when the read error occurs; and
   determining an optimum bias and write currents required to successfully execute pinning reset of the GMR read element based on a resistance value of the GMR read element;
   supplying the optimum bias and write currents to the GMR read element and the write element, respectively;
   changing the bias current value, if recovery from the read error fails after the optimum bias and write currents have been supplied; and
   re-performing a read operation based on the changed bias current value.

* * * * *